(12) United States Patent
Guetter et al.

(10) Patent No.: US 11,302,107 B2
(45) Date of Patent: Apr. 12, 2022

(54) SYSTEM AND METHOD FOR CLASSIFYING CELLS IN TISSUE IMAGES BASED ON MEMBRANE FEATURES

(71) Applicant: VENTANA MEDICAL SYSTEMS, INC., Tucson, AZ (US)

(72) Inventors: Christoph Guetter, Tuscon, AZ (US); Kien Nguyen, Tuscon, AZ (US)

(73) Assignee: Ventana Medical Systems, Inc., Tucson, AZ (US)

(*) Notice: Subject to any disclaimer, the term of this patent is extended or adjusted under 35 U.S.C. 154(b) by 42 days.

(21) Appl. No.: 16/896,592

(22) Filed: Jun. 9, 2020

(65) Prior Publication Data

US 2020/0302153 A1 Sep. 24, 2020

Related U.S. Application Data

(63) Continuation of application No. PCT/EP2018/085286, filed on Dec. 17, 2018.

(60) Provisional application No. 62/609,719, filed on Dec. 22, 2017.

(51) Int. Cl.
*G06V 20/69* (2022.01)
*G06K 9/62* (2022.01)
*G06V 10/44* (2022.01)

(52) U.S. Cl.
CPC ......... *G06V 20/698* (2022.01); *G06K 9/6242* (2013.01); *G06K 9/6256* (2013.01); *G06V 10/443* (2022.01)

(58) Field of Classification Search
CPC ......... G06T 2207/30024; G06T 7/0014; G06T 7/0012; G06K 2209/05; G06K 9/00127; G01N 15/1475; G01N 33/4833
See application file for complete search history.

(56) References Cited

U.S. PATENT DOCUMENTS 7,299,088 B1 * 11/2007 Thakor ............... A61B 5/4094
600/544
7,761,240 B2 * 7/2010 Saidi ................. G06T 7/0012
702/19
7,764,822 B2 * 7/2010 Ramm ............... G01N 21/6428
382/133

(Continued)

FOREIGN PATENT DOCUMENTS

JP 2015508639 A 3/2015
WO 2017037180 3/2017

OTHER PUBLICATIONS

Irshad et al., "Methods for Nuclei Detection, Segmentation, and Classification in Digital Histopathology: A Review—Current Status and Future Potential", IEEE Reviews in Biomedical Engineering, vol. 7, Dec. 2013, pp. 97-114.

(Continued)

*Primary Examiner* — Yosef Kassa
(74) *Attorney, Agent, or Firm* — Kilpatrick Townsend & Stockton LLP

(57) ABSTRACT

An image analysis system and method classify cells in a tissue image. The system and method may extract at least one image feature characterizing an object in the tissue image. Based on the extracted image feature, cells may be classified according to at least one predefined membrane pattern. For each classified cell, a class label that identifies a class to which the classified cell belongs may be outputted.

20 Claims, 7 Drawing Sheets

(56) References Cited

U.S. PATENT DOCUMENTS

| | | | | |
|---|---|---|---|---|
| 7,907,769 | B2* | 3/2011 | Sammak | G06K 9/6269 |
| | | | | 382/133 |
| 8,036,462 | B2* | 10/2011 | Can | G06K 9/00147 |
| | | | | 382/173 |
| 8,131,476 | B2* | 3/2012 | Cline | G01N 1/30 |
| | | | | 702/19 |
| 8,488,863 | B2* | 7/2013 | Boucheron | G06T 7/11 |
| | | | | 382/133 |
| 8,515,150 | B2* | 8/2013 | Mangoubi | G06K 9/6276 |
| | | | | 382/133 |
| 8,831,327 | B2* | 9/2014 | Santamaria-Pang | G16B 40/20 |
| | | | | 382/133 |
| 8,838,565 | B2* | 9/2014 | Bradshaw | G16H 50/70 |
| | | | | 707/706 |

OTHER PUBLICATIONS

PCT/EP2018/085286, "International Search Report and Written Opinion", dated Mar. 28, 2019, 12 pages.

Irshad, et al., "Methods for Nuclei Detection, Segmentation, and Classification in Digital Histopathology: A Review—Current Status and Future Potential", IEEE Review s in Biomedical Engineering, vol. 7, 2014, pp. 97-114.

Shimada, et al., "Cell Image recognition Using Local Features", IEICE Technical Report, Feb. 10, 2012, 9 pages (6 pages, Original Document, 3 pages English Abstract and Information).

Japan Application No. JP2020-534826 received an Office Action dated Aug. 30, 2021, 10 pages. (5 pages Original Document, 5 pages English Translation).

* cited by examiner

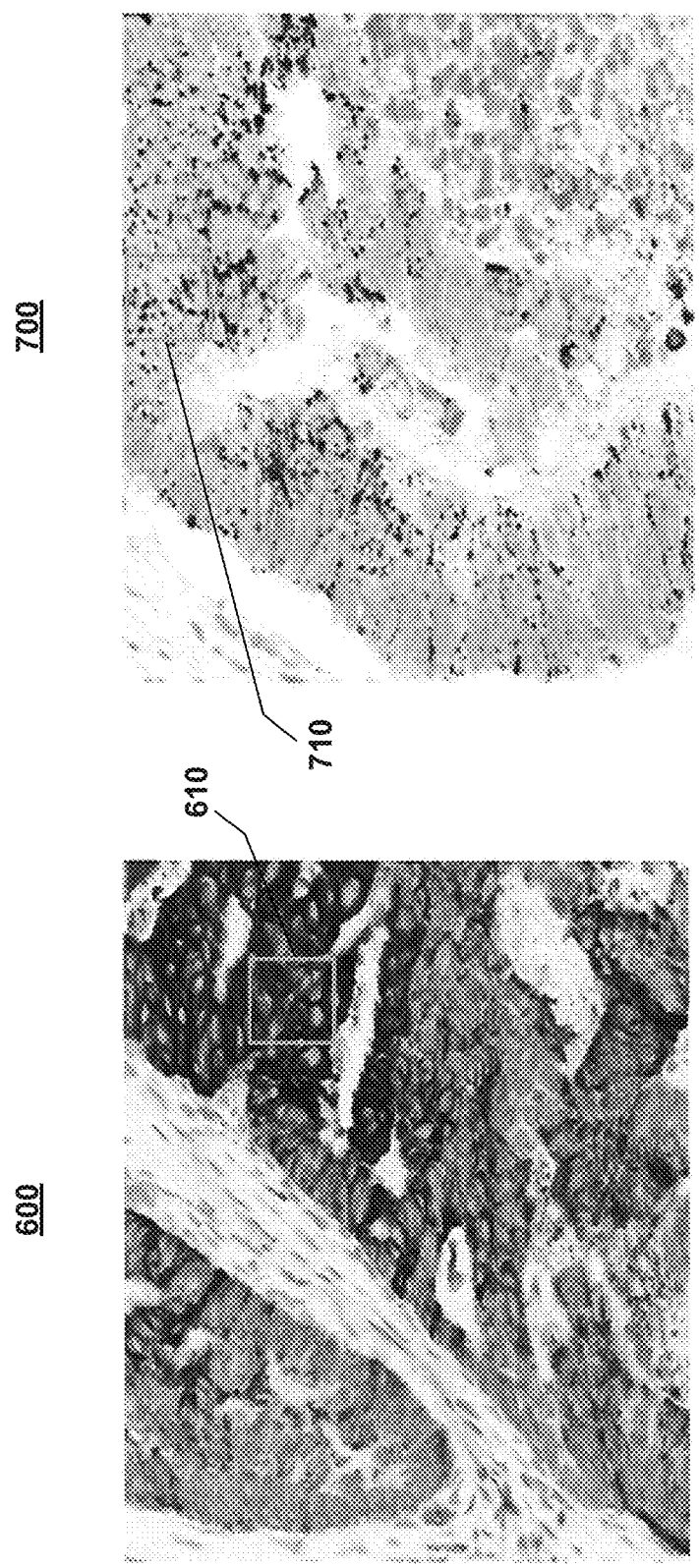

SYSTEM AND METHOD FOR CLASSIFYING CELLS IN TISSUE IMAGES BASED ON MEMBRANE FEATURES

CROSS-REFERENCES TO RELATED APPLICATIONS

The present application is a continuation of International Application PCT/EP2018/085286, entitled "System And Method For Classifying Cells In Tissue Images Based On Membrane Features" and filed Dec. 17, 2018, which claims priority to U.S. Provisional Application No. 62/609,719, filed Dec. 22, 2017. Each of these applications is hereby incorporated by reference in its entirety for all purposes.

BACKGROUND

Field of the Disclosure

The present disclosure relates to digital image processing methods and systems for medical diagnosis. Particularly, the present disclosure relates to the classification of cells in tissue images based on specific membrane features.

Description of Related Art

In the analysis of biological specimens such as tissue sections, blood, cell cultures and the like, biological specimens are mounted on slides and stained with one or more combinations of stain and biomarkers, and the resulting assay is viewed or imaged for further analysis. An assay may include biological specimens such as tissue sections from human subjects that are treated with a stain containing a fluorophore or chromogen conjugated to an antibody which binds to protein, protein fragments, or other targets in the specimens. Observing the assay enables a variety of processes, including diagnosis of disease, assessment of response to treatment, and development of new drugs to fight diseases.

Upon scanning the assay, multiple information channels of image data including color channels are derived, with each observed channel comprising a mixture of multiple signals. One of the most common examples of assay staining is the Hematoxylin-Eosin (H&E) staining, which includes two stains that help identify tissue anatomy information. The Hematoxylin mainly stains the cell nuclei with a generally blue color, while the Eosin acts mainly as a cytoplasmic generally pink stain. A special staining assay may identify target substances in the tissue based on their chemical character, biological character, or pathological character.

An immunohistochemistry (IHC) assay includes one or more stains conjugated to an antibody that binds to protein, protein fragments, or other structures of interest in the specimen, hereinafter referred to as targets or objects of interest. The antibodies and other compounds (or substances) that bind a target in the specimen to a stain, are referred to herein as biomarkers.

For an H&E or a special staining assay, biomarkers have a fixed relationship to a stain (e.g., Hematoxylin counterstain), whereas for an IHC assay, a choice of antibody protein may be used for a biomarker to develop and create a new assay. Biological specimens are prepared according to an assay before imaging. Upon applying a single light source, a series of multiple light sources, or any other source of input spectra to the tissue, the assay can be assessed by an observer, typically through a microscope, or image data can be acquired from the assay for further processing.

In such an acquisition, multiple information channels of image data, for example color channels, are derived, with each observed channel comprising a mixture of multiple signals. Processing of this image data can include methods of color deconvolution also referred to as spectral unmixing, color separation, etc., that are used to determine a local concentration of specific stains from the observed channel or channels of image data. For image data processed by automated methods, depicted on a display, or for an assay viewed by an observer, a relation may be determined between the local appearance of the stained tissue and the applied stains and biomarkers to determine a model of the biomarker distribution in the stained tissue.

An important area in digital image analysis in the healthcare field is the ability to identify and quantify staining for analytes of interest in specific subcellular locations. Algorithms for doing such analyses currently exist. For example, algorithms are currently known for detecting membrane expression of HER2 and cMET. These algorithms rely on nuclei detection to search for stained membrane on a local neighborhood around nuclei, using a predefined threshold to define the neighborhood around the nuclei to be searched for membrane regions. Hence, if these algorithms miss the nuclei or if the membrane lies outside the predefined neighborhood radius, stained membrane around them might not be detected. Additionally, the algorithms might ignore regions that contain membrane staining in combination with other staining compartments (such as cytoplasmic staining). Thus, quantification of staining using these methods could be incomplete or incorrect.

Several approaches to cell classification have been presented in the field. While certain exemplary approaches may generally explore contextual information around the cells, they propose generic solutions and do not explicitly target the difference in structures or appearance of different membrane staining patterns. Although these prior approaches could provide a certain level of contextual data for the cells, there still remains a long-felt need for accurately classifying the cells in tissue images based on specific membrane features, in particular when it is essential to differentiate different cell types based on the distinct pattern of the cell membrane. Recently, immunotherapy approaches to address the need for sustainable cancer treatments have shown a more complex staining pattern along the cell membrane depending on the state and type of the cell.

SUMMARY

The present disclosure addresses the foregoing concern by providing, inter alia, a digital image processing system and method for the automatic classification of cells in stained tissue images, particularly in tissue images. More specifically, the present digital image processing system includes a digital storage medium that stores digitally encoded, non-transitory computer-readable instructions for execution by one or more processors, in order to implement the method of the present disclosure.

In one embodiment, an input image is fed to a color deconvolution module for deconvolution into two color channels that are processed separately. A color deconvolution module generates two or more separate images from the input image: a hematoxylin (HTX) stained tissue image and a Diaminobenzidine (DAB) stained image. In this exemplary illustration, a cell classification engine aims at classifying cells based on the structure of the stained cell membrane.

A difference of Gaussian (DoG) filter may be applied to the membrane stained image, in order to generate a filtered image. One reason for filtering the membrane staining image using the DoG filter is because the DoG filter helps to enhance the intensity of specific sub-regions that may encompass a recognizable patterned membrane structure.

An Otsu thresholding module may be applied to the filtered image, in order to further enhance faint staining details of the membrane structure by generating a membrane mask image. Blob extraction may then be applied to the membrane mask image, so as to extract blob objects with a sub-region of interest, by connecting the various components or features within the sub-region.

In order to further improve the discrimination between the elliptical membrane staining pattern and the punctate membrane staining pattern, the cell classification engine computes statistical values related to the membrane blob objects for every detected cell. These statistical values are designed to associate the visual representations of the cells, and are stored in a training database for future use as aid in accurate cell identification.

BRIEF DESCRIPTION OF THE DRAWINGS

The various features of the present disclosure and the manner of attaining them will be described in greater detail with reference to the following description, claims, and drawings wherein:

FIG. 6 depicts an exemplary elliptical staining pattern in an epidermal growth factor receptor (EGFR) staining image;

FIG. 7 depicts an exemplary punctate staining pattern in an EGFR staining image;

Figure 1:
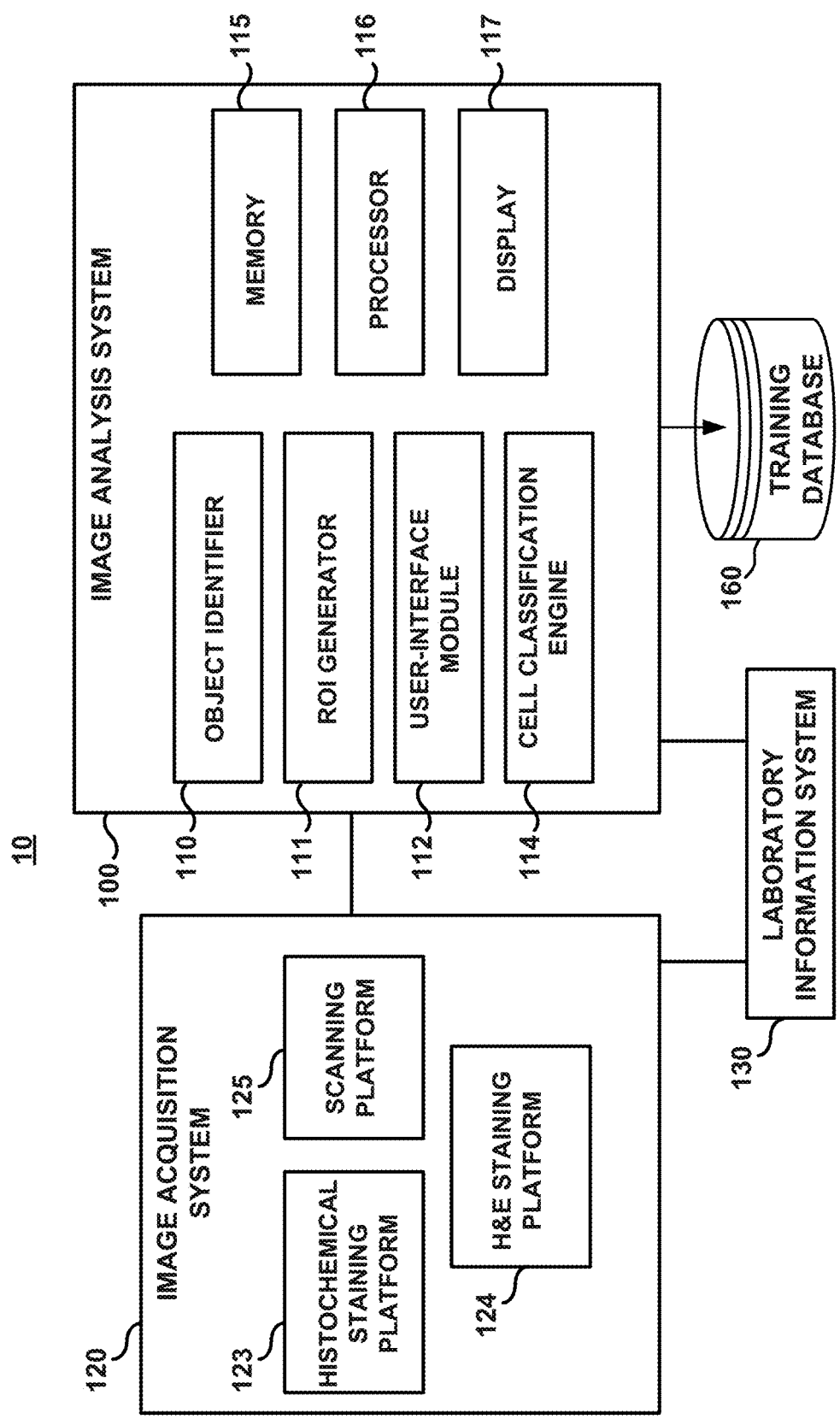
FIG. 1 depicts a computer-based cellular detection system that is adapted to classify cells in tissue images based on specific membrane features, in accordance with an exemplary embodiment of the subject disclosure.

It will be appreciated that for simplicity and clarity of illustration, reference numbers may be reused among the figures to indicate corresponding or analogous features.

DETAILED DESCRIPTION

I—Definitions

Unless defined otherwise, technical and scientific terms used herein have the same meaning as commonly understood by a person of ordinary skill in the art. See, e.g., Lackie, DICTIONARY OF CELL AND MOLECULAR BIOLOGY, Elsevier (4th ed. 2007); Sambrook et al., MOLECULAR CLONING, A LABORATORY MANUAL, Cold Springs Harbor Press (Cold Springs Harbor, N.Y. 1989).

Analytically distinct staining patterns: Two or more different spatial relationships of the same analyte or group of analytes that convey different biological meanings. For example, transcription factors can be localized either to the cytoplasm (in which case they are likely to be inactive) or to the nucleus (in which case they are likely activated). Thus, a "cytoplasmic" staining pattern and a "nuclear" staining pattern are analytically distinct. Similarly, certain cell surface receptors can have staining patterns showing localized to the membrane, or localized to the cytoplasm. The relevant activity of the receptor may be different depending on where the receptor is localized. Thus, in this example, a "membrane" staining pattern is analytically distinct from a "cytoplasmic" staining pattern. In other cases, however, the localization of a particular analyte may not be important. For example, an immunohistochemical assay for the particular localization of phosphorylation signal of a receptor tyrosine kinase likely would not be analytically relevant.

Antibody: The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

Biomarker: As used herein, the term "biomarker" shall refer to any molecule or group of molecules found in a biological sample that can be used to characterize the biological sample or a subject from which the biological sample is obtained. For example, a biomarker may be a molecule or group of molecules whose presence, absence, or relative abundance is:

characteristic of a particular cell or tissue type or state;
characteristic of a particular pathological condition or state; or
indicative of the severity of a pathological condition, the likelihood of progression or regression of the pathological condition, and/or the likelihood that the pathological condition will respond to a particular treatment.

As another example, the biomarker may be a cell type or a microorganism (such as bacteria, mycobacteria, fungi, viruses, and the like), or a substituent molecule or group of molecules thereof. As intended herein, biomarker imaging includes, without limitation, multiplexed tissue biomarker imaging.

Biomarker-specific reagent: A specific detection reagent that is capable of specifically binding directly to one or more biomarkers in the cellular sample, such as a primary antibody.

Cell detection: Automated process of a computer to identify the location of a particular cell in an image.

Cellular sample: As used herein, the term "cellular sample" refers to any sample containing intact cells, such as cell cultures, bodily fluid samples or surgical specimens taken for pathological, histological, or cytological interpretation. A biological sample can be a tissue or a cell sample. The source of the tissue or cell sample may be solid tissue as from a fresh, frozen and/or preserved organ or tissue sample or biopsy or aspirate; blood or any blood constituents; bodily fluids such as cerebral spinal fluid, amniotic fluid, peritoneal fluid, or interstitial fluid; cells from any time in gestation or development of the subject. The cellular sample can also be obtained from in vitro tissue or cell culture. The cellular sample may contain compounds which are not naturally intermixed with the cells in nature such as preservatives, anticoagulants, buffers, fixatives, nutrients, antibiotics, or the like. Examples of cellular samples herein include, but are not limited to, tumor biopsies, circulating tumor cells, serum or plasma, primary cell cultures or cell lines derived from tumors or exhibiting tumor-like properties, as well as preserved tumor samples, such as formalin-fixed, paraffin-embedded tumor samples or frozen tumor samples.

Computer program: Also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computing system: Also referred to as computer, includes any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Counterstain: A stain with color contrasting to the principal stain, making the stained object more readily detectable. For example, eosin counterstain to hematoxylin in an H&E stain.

Cytoplasmic staining: A group of pixels arranged in a pattern bearing the morphological characteristics of a cytoplasmic region of a cell.

Marker: A stain, dye, or a tag that allows a biomarker to be differentiated from ambient tissue and/or from other biomarkers. The term "biomarker" may be understood in the sense of a tissue feature, such as the presence of a particular cell type, for instance immune cells, and more particularly, a tissue feature indicative of a medical condition. The biomarker may be identifiable by the presence of a particular molecule, for instance a protein, in the tissue feature.

Membrane/punctate region: A region in which diffuse membrane staining is intermixed with punctate staining.

Processor: Encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Punctate staining: A group of pixels with strong localized intensity of staining appearing as spots/dots scattering on the membrane area of the cell.

Sample: As used herein, the term "sample" shall refer to any material obtained from an object or target capable of being tested for the presence or absence of a biomarker.

Stain: When used as a noun, the term "stain" shall refer to any substance that can be used to visualize specific molecules or structures in a cellular sample for microscopic analysis, including brightfield microscopy, fluorescent microscopy, electron microscopy, and the like. When used as a verb, the term "stain" shall refer to any process that results in deposition of a stain on a cellular sample.

Subject: When used as a noun, the term "subject" or "individual" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

Test sample: A tumor sample obtained from a subject having an unknown outcome at the time the sample is obtained.

Tissue sample: As used herein, the term "tissue sample" shall refer to a cellular sample that preserves the cross-sectional spatial relationship between the cells as they existed within the subject from which the sample was obtained. "Tissue sample" shall encompass both primary tissue samples (i.e. cells and tissues produced by the subject) and xenografts (i.e. foreign cellular samples implanted into a subject).

Tissue specimen: Encompasses any type of biological specimen such as tissue sections, blood, cell cultures, and like biological samples, that can be mounted on a slide.

User Interface Devices: Include a display which provides for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. Embodiments of the subject matter described in this specification can be implemented in a computing system that includes a back-end component, e.g., as a data server, or that includes a middleware component, e.g., an application server, or that includes a front-end component, e.g., a client computer having a graphical user interface device or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

II—Cellular Detection System

With reference to FIG. 1, a cellular detection system 10 is provided according to an exemplary embodiment of the present disclosure. The cellular detection system 10 may be adapted to automatically detect the presence of cells in stained tissue images and particularly, to automatically detect and classify cells in tissue images. The cellular detection system 10 generally includes an image analysis system 100 and an image acquisition system 120.

One or more digital images of a stained biological sample are acquired by an image acquisition system 120. Essentially, any suitable imaging method capable of generating a color digital image can be used. For example, an R, G, B input color image 210 (FIG. 2) of the stained tissue sample (tissue specimen or cellular sample) can be generated and stored in a storage device, such as a local computer, disc drive, solid state drive, a server machine, or the like.

Image analysis system 100 may include one or more computing devices such as desktop computers, laptop computers, tablets, smartphones, servers, application-specific computing devices, or any other type(s) of electronic device(s) capable of performing the techniques and operations described herein. In some embodiments, image analysis system 100 may be implemented as a single device. In other embodiments, image analysis system 100 may be implemented as a combination of two or more devices together achieving the various functionalities described herein. For example, image analysis system 100 may include one or more server computers and one or more client computers communicatively coupled to each other via one or more local-area networks and/or wide-area networks such as the Internet or Intranet.

Figure 2:
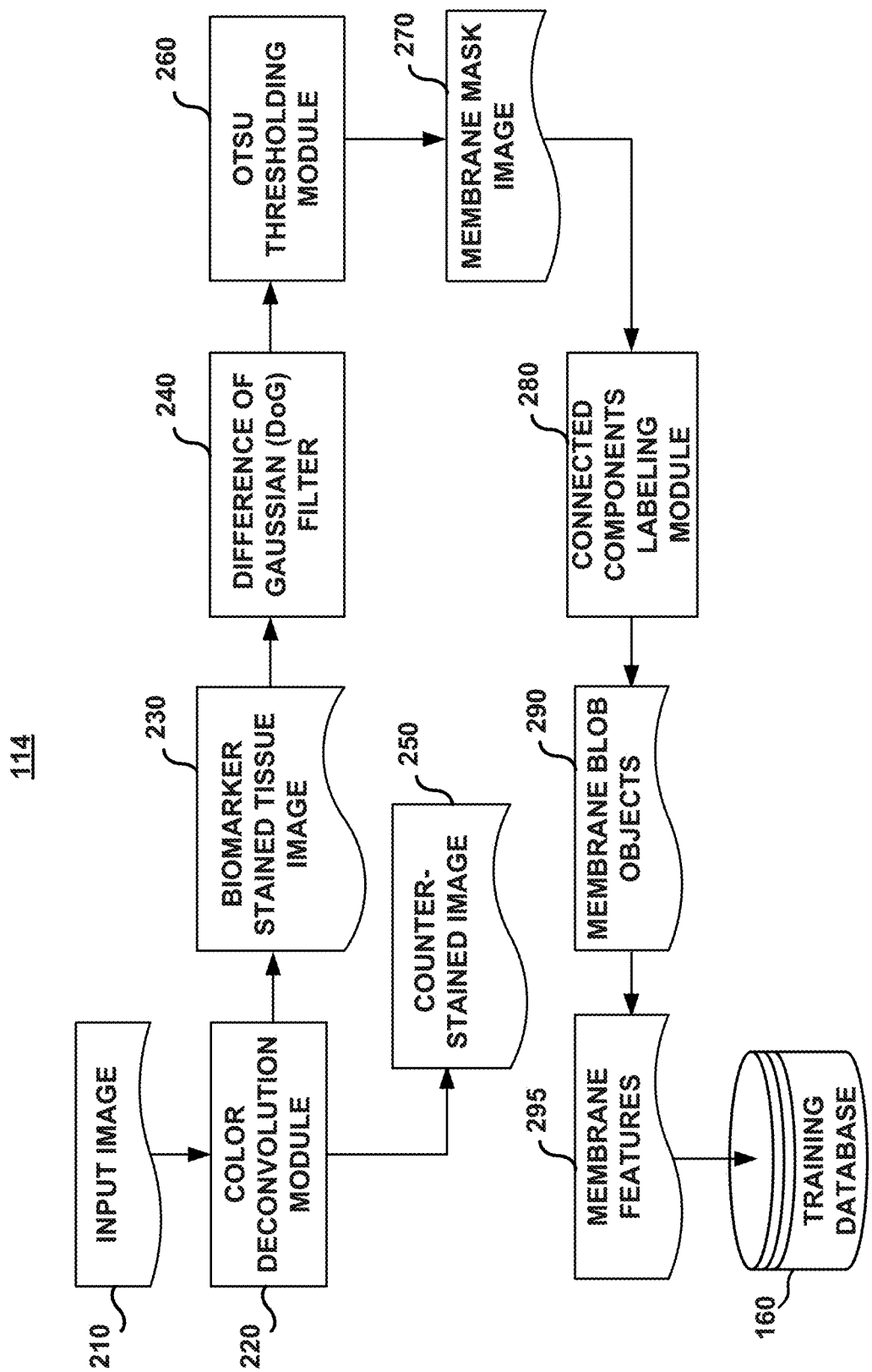
FIG. 2 is a block diagram of a cell classification engine that forms part of the cellular detection system of FIG. 1, in accordance with an exemplary embodiment of the subject disclosure.

Image analysis system 100 may include a memory 115, a processor 116, and a display 117. Memory 115 may include any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. Memory 115 may store non-transitory computer-readable instructions for processor 116 to execute the workflows of the present disclosure at it will be described later in more detail. For brevity purposes, memory 115 is depicted in FIG. 2 as a single device, but it is appreciated that memory 115 can also be distributed across two or more devices.

Processor 116 may include one or more processors of any type, such as central processing units (CPUs), graphics processing units (GPUs), special-purpose signal or image processors, field-programmable gate arrays (FPGAs), tensor processing units (TPUs), and so forth. For brevity purposes, processor 116 is depicted in FIG. 2 as a single device, but it is appreciated that processor 116 can also be distributed across any number of devices.

Display 117 may be implemented using any suitable technology, such as LCD, LED, OLED, TFT, Plasma, etc. In some implementations, display 117 may be a touch-sensitive display (a touchscreen).

Image analysis system 100 may also include an object identifier 110, a region of interest (ROI) generator 111, a user-interface module 112, and a cell classification engine 114. While these modules are depicted in FIG. 1 as stand-alone modules, it will be evident to persons having ordinary skill in the art that each module may instead be implemented as a number of sub-modules, and that in some embodiments any two or more modules can be combined into a single module. Furthermore, in some embodiments, system 100 may include additional engines and modules (e.g., input devices, networking and communication modules, etc.) not depicted in FIG. 1 for brevity. Furthermore, in some embodiments, some of the blocks depicted in FIG. 1 may be disabled or omitted. As it will be discussed in more detail below, the functionality of some or all the modules of system 100 can be implemented in hardware, software, firmware, or as any combination thereof. Exemplary commercially-available software packages useful in implementing modules as disclosed herein include VENTANA VIRTUOSO; Definiens TISSUE STUDIO, DEVELOPER XD, and IMAGE MINER; and Visiopharm BIOTOPIX, ONCOTOPIX, and STEREOTOPIX software packages.

After acquiring input image 210, image analysis system 100 may pass the image 210 to object identifier 110, which functions to identify and mark relevant objects and other features within image 210 that will later be used for cell classification. Object identifier 110 may extract from (or generate for) each image 210, a plurality of image features characterizing the various objects in the image. In another embodiment, the object identifier 110 may extract from (or generate for) each image 210 a plurality of image features characterizing raw pixels representing biomarker expressions.

The extracted image features may comprise, for example, texture features such as Haralick features, bag-of-words features and the like, including but not limited to: shape, intensity, or other statistical features. The values of the plurality of image features may be combined into a high-dimensional vector, hereinafter referred to as the "feature vector" that may be used to characterize the expression of the biomarker, a particular object, or the object location in the image. For example, if M features are extracted for each object and/or pixel, each object and/or pixel can be characterized by an M-dimensional feature vector. The output of object identifier 110 is effectively a map of the image annotating the position of objects and pixels of interest and associating those objects and pixels with a feature vector describing the object or pixels. It should be understood that the feature vector is described herein for purposes of illustration only and that the present disclosure is not limited to biomarkers; for example, the cell type may also be included.

For biomarkers that are scored on the basis of the biomarker's association with a particular type of object (such as membranes, nuclei, cells, etc.), the features extracted by object identifier 110 may include features or feature vectors sufficient to categorize the objects in the sample as biomarker-positive objects of interest or biomarker-negative markers of interest and/or by level or intensity of biomarker staining of the object. In cases where the biomarker may be weighted differently depending on the object type that is expressing it (such as immune escape biomarkers such as PD-L1, PD-L2, and IDO, which can be scored on the basis of tumor cell expression, immune cell expression, or both), the features extracted by object identifier 110 may include features relevant to determining the type of objects associated with biomarker-positive pixels. Thus, using biomarker imaging, the objects may then be categorized at least on the basis of biomarker expression (for example, biomarker-positive or biomarker-negative cells) and, if relevant, a sub-type of the object (e.g. tumor cell, immune cell, etc.). In cases where extent of biomarker-expression is scored regardless of association with objects, the features extracted by object identifier 110 may include for example location and/or intensity of biomarker-positive pixels.

Image analysis system 100 may also pass image 210 to ROI generator 111. ROI generator 111 may be used to identify the region(s) of interest, ROI or ROIs of image 210 from which an immune context score may be calculated. In cases where the object identifier 110 is not applied to the whole image, the ROI or ROIs generated by the ROI generator 111 may also be used to define a subset of the image on which object identifier 110 is executed. In one embodiment, ROI generator 111 may be accessed through user-interface module 112. An image of the biomarker-stained sample (or a morphologically-stained serial section of the biomarker-stained sample) is displayed on a graphic user interface of the user-interface module 112, and the user annotates one or more region(s) in the image to be considered ROIs. ROI annotation can take a number of forms in this example. For instance, the user may manually define the ROI (referred to hereafter as "freeform ROI annotation").

In other examples, the ROI generator 111 may assist the user in annotating the ROI. For example, the user may annotate an edge in the image (such as, for example, a leading edge of an invasive margin of a tumor, or an edge denoting a transition from tumor core to invasive margin of a tumor), and ROI generator 111 may automatically define an ROI based on the user-defined edge. For example, the user may annotate the leading edge of the invasive margin in user-interface module 112, and the ROI generator 111 creates an ROI using the edge as a guide, for example, by drawing an ROI encompassing all objects within a predefined distance of the edge or within a predefined distance of one side of the edge. In some cases, the user may be given an option to modify the ROI annotated by ROI generator 111, such as by expanding the ROI, annotating regions of the ROI or objects within the ROI to be excluded from analysis, etc. In other embodiments, ROI generator 111 may automatically suggest an ROI without any direct input from the user (for example, by applying a tissue segmentation function to an unannotated image), which the user may then chose to accept, reject, or edit as appropriate. In some embodiments, ROI generator 111 may also include a registration function, whereby an ROI annotated in one section of a set of serial sections is automatically transferred to other sections of the set of serial sections. This functionality is especially useful when there are multiple biomarkers being analyzed, or when an H&E-stained serial section is provided along with the biomarker-labeled sections.

In some embodiments, image analysis system 100 may be communicatively coupled to image acquisition system 120. Image acquisition system 120 may obtain images of biological specimens and provide those images 210 to image analysis system 100 for analysis and presentation to the user.

Image acquisition system 120 may include a scanning platform 125 such as a slide scanner that can scan the stained slides at 20×, 40×, or other magnifications to produce high resolution whole-slide digital images, including for example slide scanners. At a basic level, the typical slide scanner includes at least: (1) a microscope with lens objectives, (2) a light source (such as halogen, light emitting diode, white light, and/or multispectral light sources, depending on the dye), (3) robotics to move glass slides around (or to move the optics around the slide), (4) one or more digital cameras for image capture, (5) a computer and associated software to control the robotics and to manipulate, manage, and view digital slides. Digital data at a number of different X-Y locations (and in some cases, at multiple Z planes) on the slide are captured by the camera's charge-coupled device (CCD), and the images are joined together to form a composite image of the entire scanned surface. The following are exemplary methods to accomplish this task:

(1) Tile based scanning, in which the slide stage or the optics are moved in very small increments to capture square image frames, which overlap adjacent squares to a slight degree. The captured squares are then automatically matched to one another to build the composite image; and (2) Line-based scanning, in which the slide stage moves in a single axis during acquisition to capture a number of composite image "strips." The image strips can then be matched with one another to form the larger composite image.

Images generated by scanning platform 125 may be transferred to image analysis system 100 or to a server or database accessible by image analysis system 100. In some embodiments, the images may be transferred automatically via one or more local-area networks and/or wide-area networks. In some embodiments, image analysis system 100 may be integrated with or included in scanning platform 125 and/or other modules of image acquisition system 120, in which case the image may be transferred to image analysis system, e.g., through a memory accessible by both of the scanning platform 125 and system 120.

In some embodiments, image acquisition system 120 may not be communicatively coupled to image analysis system 100, in which case the images may be stored on a non-volatile storage medium of any type (e.g., a flash drive) and downloaded from the medium to image analysis system 100 or to a server or database communicatively coupled thereto. In any of the above examples, image analysis system 100 may obtain an image of a biological sample, where the sample may have been affixed to a slide and stained by histochemical staining platform 123, and where the slide may have been scanned by a slide scanner or another type of scanning platform 125. It is appreciated, however, that in other embodiments, below-described techniques may also be applied to images of biological samples acquired and/or stained through other means.

In some embodiments, image acquisition system 120 may not be communicatively coupled to image analysis system 100, in which case the images may be stored on a non-volatile storage medium of any type (e.g., a flash drive) and downloaded from the medium to image analysis system 100 or to a server or database communicatively coupled thereto. In any of the above examples, image analysis system 100 may obtain an image of a biological sample, where the sample may have been affixed to a slide and stained by histochemical staining platform 123, and where the slide may have been scanned by a slide scanner or another type of scanning platform 125. It is appreciated, however, that in other embodiments, below-described techniques may also be applied to images of biological samples acquired and/or stained through other means.

The cell detection system 10 may further include a laboratory information system (LIS) 130 and a training database 160. LIS 130 typically performs one or more functions selected from: recording and tracking processes performed on samples and on slides and images derived from the samples, instructing different components of the immune context scoring system to perform specific processes on the samples, slides, and/or images, and track information about specific reagents applied to samples and or slides (such as lot numbers, expiration dates, volumes dispensed, etc.).

After both the object identifier 110 and ROI generator 111 have been implemented, the cell classification engine 114 is implemented, as it will be described later in more detail. The cell classification engine 114, which is also referred to herein as a classifier module 114, may be adapted to execute a trained pattern recognition algorithm, in order to classify each cell according to the patterns being investigated. The output of cell classification engine 114 may be a class label indicating the pre-defined class that the detected cell belongs to, e.g., cell type class or biomarker positive/negative class. The output of cell classification engine 114 is stored in a training database 160.

III—Cell Classification Engine and Workflow

Figure 3:
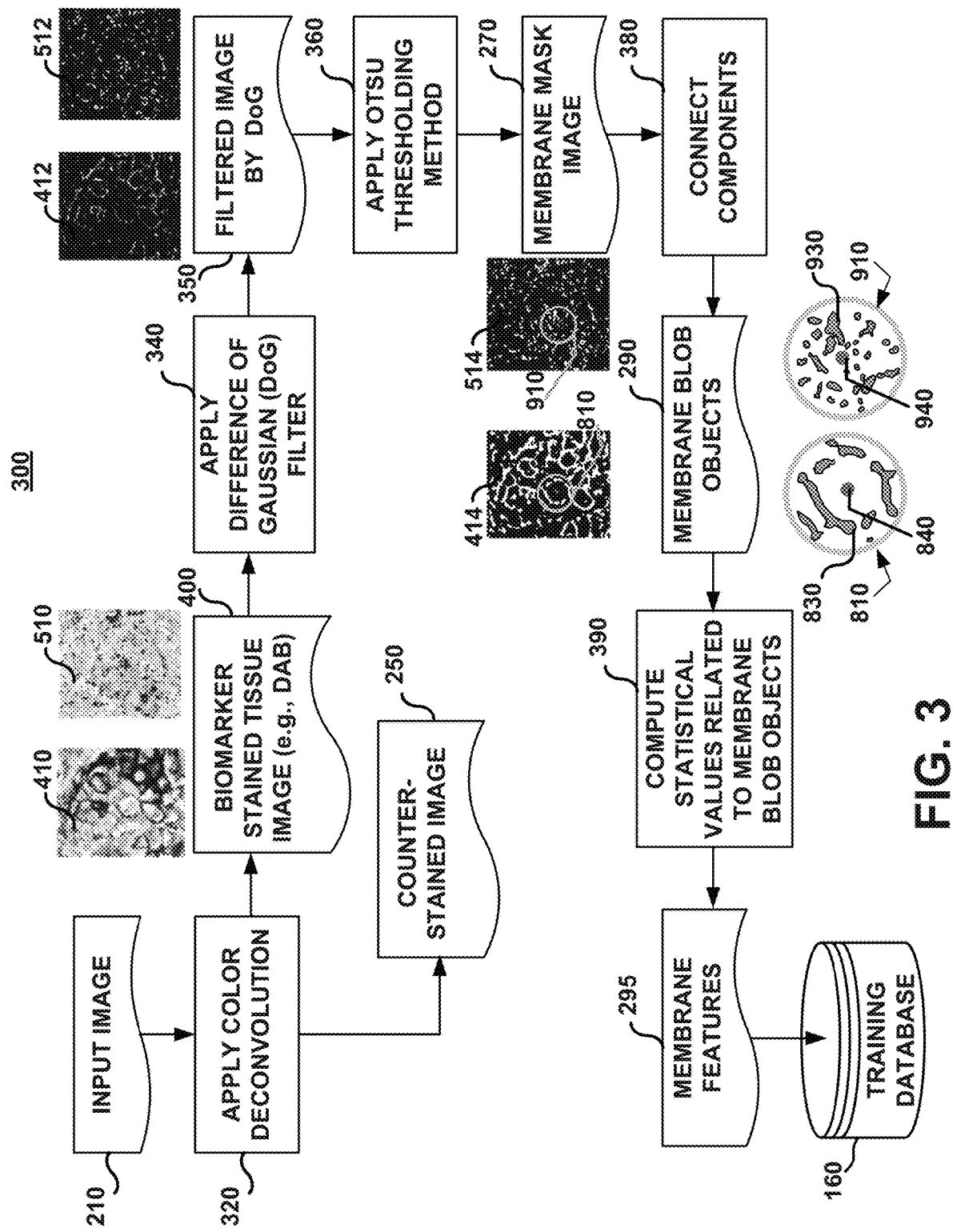
FIG. 3 depicts a workflow implemented by the cell classification engine of FIG. 2, in accordance with an exemplary embodiment of the subject disclosure.

With reference to FIG. 2, it illustrates a cell classification engine 114 that forms part of image analysis system 100. FIG. 3 illustrates a workflow 300 implemented by cell classification engine 114 based on specific membrane staining patterns. In membrane staining or tissue images, membranes of different types of cells can be stained with different patterns. The membrane staining patterns can serve as a useful source of information to classify the cells. To this end, cell classification engine 114 helps distinguish between cells stained by a plurality of distinct patterns; for example, two of these patterns that are described in correlation with the present illustrative embodiment, are referred to as elliptical pattern and punctate pattern.

While exemplary embodiments of the present invention may be described herein in term of the elliptical and punctate patterns, it should be amply clear that the present disclosure is not limited to these two patterns. Rather, these two patterns are used herein for illustration purpose only, and other specific patterns may be contemplated by the present disclosure.

Figure 5:
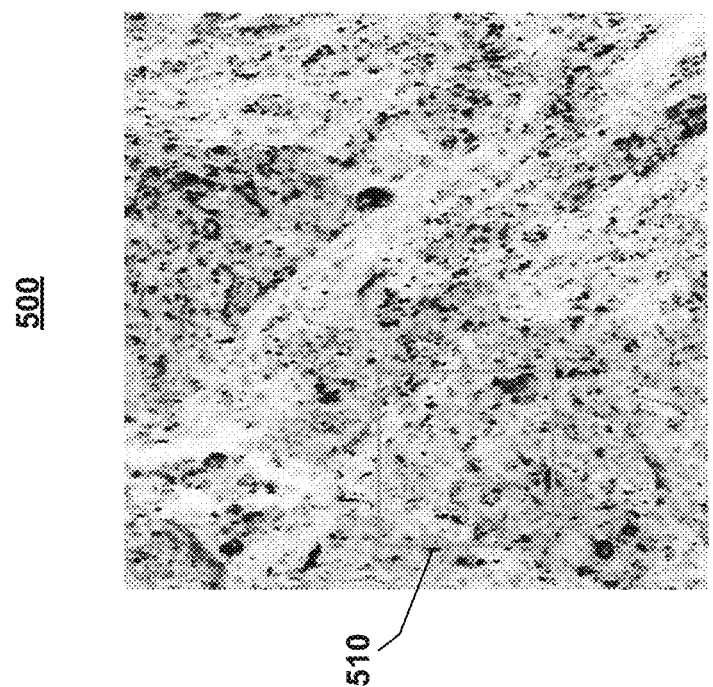
FIG. 5 depicts an exemplary punctate membrane staining pattern in a positive immune cell region of a PD-L1 staining image.
Figure 4:
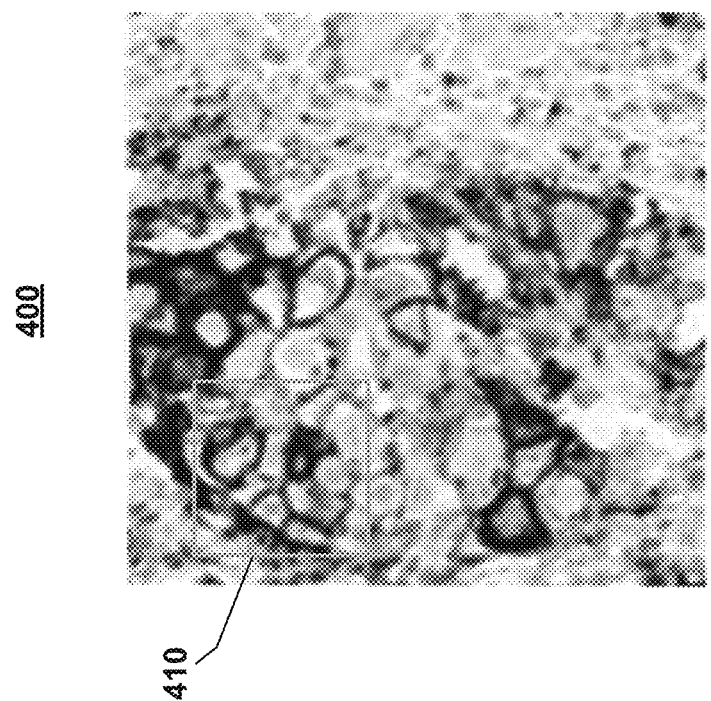
FIG. 4 depicts an exemplary elliptical membrane staining pattern in a positive tumor cell of a PD-L1 image.

For example, in PD-L1 stained image 400 (FIG. 4) and EGFR stained image 600 (FIG. 6), the membrane of a positive tumor cell may be characterized by an elliptical stain pattern, i.e., the stain appears to have the general (or substantial) shape of an ellipse around the nucleus, as illustrated in ROIs 410 (FIG. 4) and 610 (FIG. 6). On the other hand, in PD-L1 stained image 500 (FIG. 5) and EGFR stained image 700 (FIG. 7), the membrane of a positive immune cell may be characterized by a generally punctate stain pattern, i.e., the stain appears as multiple small blobs around the nucleus, as illustrated in ROIs 510 (FIG. 5) and 710 (FIG. 7).

The present disclosure describes methods for classifying the various cells based on their specific membrane (or tissue) staining patterns. To this end and with reference to FIGS. 2 and 3, input image 210 is fed to a color deconvolution module 220, for deconvoluting input image 210 into a plurality of stain images, e.g., stain 1, stain 2, ..., stain N along distinct color channels that may be processed separately. For clarity of illustration, the present embodiment will be described in connection with two exemplary stain images: a Diaminobenzidine (DAB) stained tissue image 230 which is also referred to herein as biomarker-stained tissue image 230, and a hematoxylin (HTX) stained tissue image which is also referred to herein as a counter-stained image 250.

As further illustrated at step 320 of workflow 300 (FIG. 3), color deconvolution module 220 of the present exemplary embodiment, generates two separate images from input image 210: biomarker-stained tissue image 230 and counter-stained image 250.

Figure 8A:
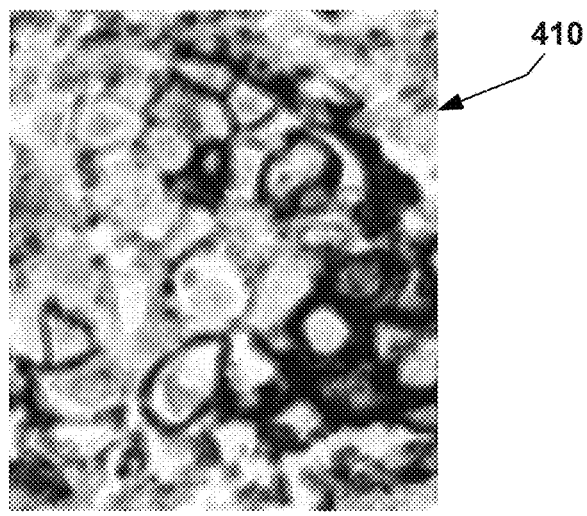
FIGS. 8A, 8B, 8C depict three exemplary sequential patterns that are processed by the cell classification engine of FIG. 2, to generate a membrane mask image for membrane features computations of an elliptical membrane stained pattern, in accordance with an exemplary embodiment of the subject disclosure.
Figure 8B:
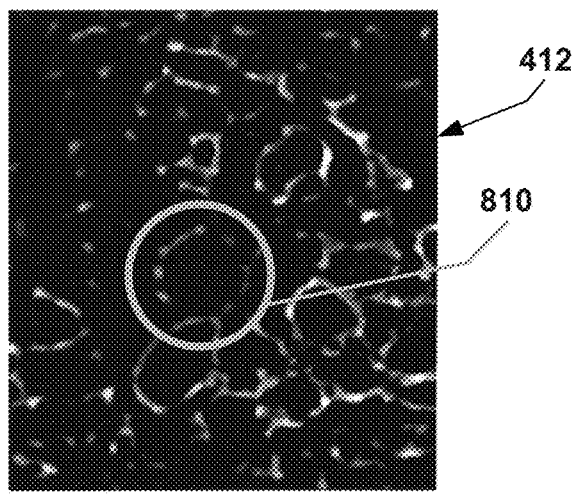
Figure 9A:
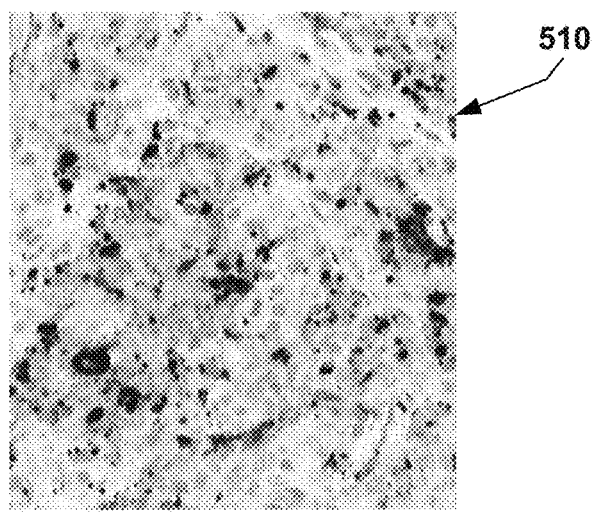
FIGS. 9A, 9B, 9C depict three exemplary sequential patterns that are processed by the cell classification engine of FIG. 2, to generate a membrane mask image for membrane features computations of a punctate membrane stained pattern, in accordance with an exemplary embodiment of the subject disclosure.
Figure 9B:
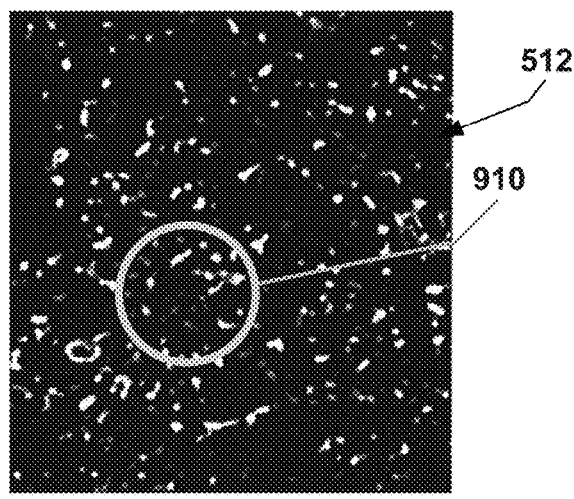

A filter, such as a difference of Gaussian (DoG) filter 240 (FIG. 2) is applied at step 340 of workflow 300 (FIG. 3) to biomarker-stained image 230 that includes stained membrane areas, in order to generate a filtered image 350. With reference to FIG. 8A, it illustrates an enlarged view of ROI 410 that forms part of stained image 400 of FIG. 4. FIG. 8B illustrates an enlarged view ROI 412 of ROI 410 after it has been filtered by DoG filter 240. Similarly, and with reference to FIG. 9A, it illustrates an enlarged view of ROI 510 that forms part of stained image 500 of FIG. 5. FIG. 9B illustrates an enlarged view 512 of ROI 510 after it has been filtered by DoG filter 240. One of the reasons for filtering the stained image 230 using DoG filter 240 is because DoG filter 240 helps to enhance the intensity of specific sub-regions that may encompass a recognizable patterned membrane structure, such as sub-regions 810 (FIG. 8B) and 910 (FIG. 9B).

Figure 8C:
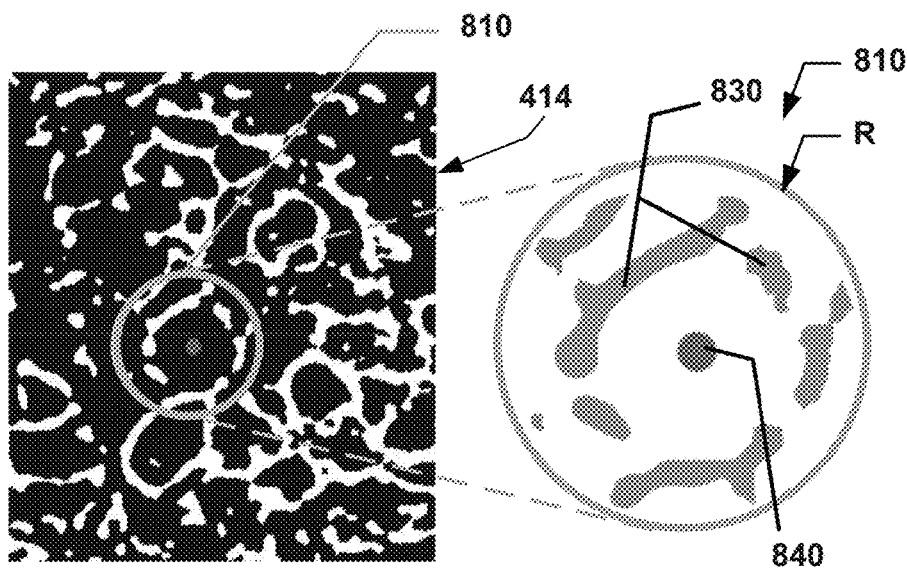

Once the intensity enhancement of these sub-regions, e.g., 810, 910 is completed, a thresholding module, such as an Otsu thresholding module 260 (FIG. 2) may be applied at step 360 of workflow 300 (FIG. 3) to the filtered image 350 (FIG. 3), to further enhance faint staining details of the membrane structure by generating a membrane mask image 270 (FIGS. 2, 3). In image processing, the Otsu thresholding method may be used to automatically perform clusteringbased image thresholding by reducing a gray level image to a binary image. FIG. 8C illustrates an enlarged view ROI 414 of ROI 412, that is generated concurrently with the creation of membrane mask image 270. A visual comparison of the filtered ROI 412 of FIG. 8B and ROI 414 of membrane mask image 270 (FIG. 8C), clearly shows an enhanced visual appearance of the membrane features within mask image 270.

Figure 9C:
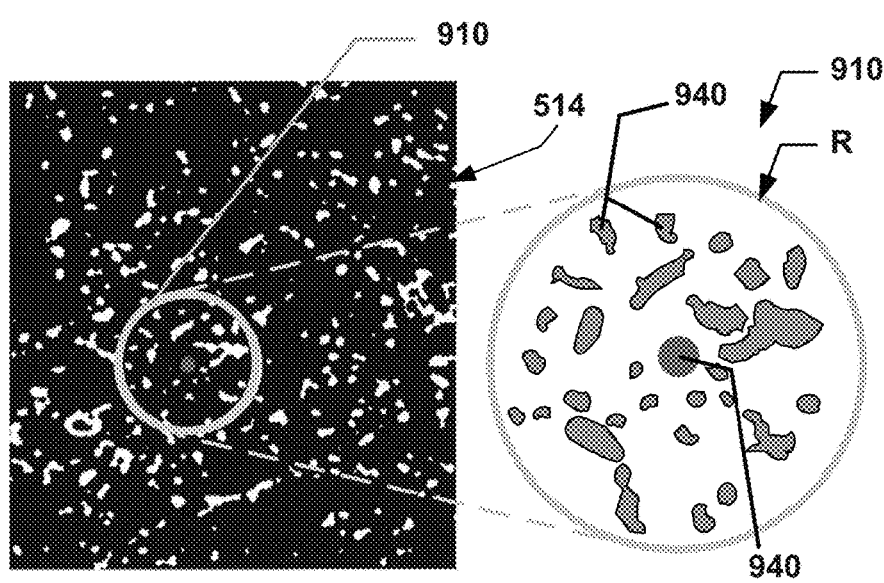

FIG. 8C further illustrates an enlarged view of sub-region 810 in order to clearly delineate the foreground (white color) and the larger blobs (or blob objects) 830 whose color has been changed from white to a darker, more visible color for better illustration. In this particular example, sub-region 810 represents a single cell with a nucleus 840 that is surrounded by a generally elliptically shaped membrane formed of large sized blobs 830. Similarly, FIG. 9C illustrates an enlarged view of sub-region 910 in order to clearly delineate the foreground (white color) and the smaller blobs (or blob objects) 930 whose color has been changed from white to a darker, more visible color for better illustration. In this particular example, sub-region 910 represents a single cell with a nucleus 940 that is surrounded by a generally punctate shaped membrane formed of small sized blobs 930.

In order to further identify and distinguish the blob objects 830, 930, a labeling module, such as a connected components labeling module 280 of cell classification engine 114 (FIG. 2) automatically connects the various components or features within the sub-regions, e.g., sub-regions 810, 910, at step 380 of workflow 300 (FIG. 3). In general, connected components labeling (also known as connected component analysis, blob extraction, region labeling, blob discovery, or region extraction) is an algorithmic application of graph theory, where subsets of connected components are uniquely labeled based on a predefined neighborhood connectivity. It works by scanning an image and identifying connected pixel regions, i.e., regions of adjacent pixels which share the same set of intensity values, in order to robustly detect and separate disconnected (or punctate) membranes from connected, elliptical (generally closed) membrane structures. Blob extraction is generally performed at step 380 on the binary membrane mask image 270 resulting from the thresholding step 360 (FIG. 3).

As a result of the connected components labeling step 380, membrane blob objects (or blobs) 290 may be counted, filtered, tracked, processed, or otherwise extracted. FIG. 3 illustrates two exemplary sub-regions surrounding cells 810, 910 with connected blobs 830 and punctate blobs 930, respectively.

In order to further improve the discrimination between the elliptical membrane staining pattern (FIG. 8C) and other membrane staining patterns, such as the punctate membrane staining pattern (FIG. 9C), when classifying the cells, cell classification engine 114 computes at step 390 of workflow 300 (FIG. 3), statistical values (also referred to herein as membrane features) 295 related to the membrane blob objects 830, 930 for every detected cell. The membrane features 295 as well as the associated visual representations of the cells are stored in training database 160 for future use, as aid in identifying the cells.

To this end, given a cell nucleus 840 (FIG. 8C) or cell nucleus 940 (FIG. 9C), cell classification engine 114 considers different concentric circular neighborhood regions R1, R2, . . . , Rn (collectively referred to as R) with decreasing radii r1<r2< . . . rn. For each neighborhood region R within a circular region, cell classification engine 114 computes the following features:

The average size of the membrane blob objects 830, 930 falling within neighborhood region R. It is expected that blob sizes in an elliptical pattern that is comprised of membrane blob objects 830 are larger than blob objects 930 in a punctate pattern.

The number of blob objects 830 falling within neighborhood region R. It is expected that there are less blob objects 830 in an elliptical pattern than blob objects 930 in a punctate pattern.

The average intensity values (computed on the membrane stain image) of pixels of the blob objects 830, 930. It is expected that the pixel intensity of blob objects 930 within a punctate pattern is stronger than the pixel intensity of blob objects 830 within the elliptical pattern. The punctate pattern usually contains dark brown dots while the elliptical pattern may contain faint brown staining regions.

The distribution of stains around the nuclei 840, 940. To compute this feature, the neighborhood R may be divided, for example, into 36 conical regions, each within an angle of 10 degrees. Next, the number of conical regions that contain any blob object 830, 930 is counted and used as a feature to describe the stain distribution around the nuclei 840, 940. It is expected that for an elliptical pattern, the number of conical regions containing blob objects 830 is larger than that within a punctate pattern.

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present invention. The use of a particular sequence is therefore, not to be taken in a limiting sense, and the scope of the present invention is defined only by the appended claims.

As it will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As it will be further appreciated, the processes in embodiments of the present invention may be implemented using any combination of software, firmware or hardware. As a preparatory step to practicing the invention in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

According to embodiments of the image analysis system, the class labels contain statistical values related to the characterized objects in the tissue image.

According to embodiments disclosed herein, image analysis system further comprises a storage for storing outputted class labels of the classified cells.

Thus, it is important that while illustrative embodiments of the present invention are described in the context of a fully functional computer (server) system with installed (or executed) software, those skilled in the art will appreciate that the software aspects of the illustrative embodiments of the present invention are capable of being distributed as a program product in a variety of forms, and that an illustrative embodiment of the present invention applies equally regardless of the particular type of media used to actually carry out the distribution.

In addition, while the present invention has been described with reference to exemplary embodiments, it will be understood by those skilled in the art that various changes may be made and equivalents may be substituted for elements thereof without departing from the scope of the invention. Furthermore, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a," "b," c," "first," "second," and "third," are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for classifying cells in a tissue image, comprising:
    accessing a tissue image, wherein the cells in the tissue image comprise membranes;
    thresholding the tissue image to generate a membrane mask image, the membrane mask image depicting membrane features corresponding to the membranes of the cells;
    extracting blob objects from the membrane mask image within a sub-region of interest by connecting the membrane features within the sub-region of interest;
    classifying, based on the blob objects, one or more of the cells within the sub-region of interest according to at least one membrane staining pattern; and outputting, for each of the one or more classified cells, a class label identifying a class to which a respective classified cell belongs.

2. The method of claim 1, further comprising storing the class labels.

3. The method of claim 2, wherein the class labels include statistical values corresponding to respective image objects of a set of image objects in the tissue image.

4. The method of claim 1, wherein the at least one membrane staining pattern comprises at least one of an elliptical staining pattern and punctate staining pattern.

5. The method of claim 1, further comprising extracting at least one feature from the tissue image.

6. A method for classifying cells in a tissue image, comprising:
accessing a tissue image;
performing a color deconvolution on the tissue image to identify distinct color channels in the tissue image and generate at least two separate images from the tissue image;
identifying an image object in a stained tissue image from the at least two separate images, wherein the image object includes a set of pixels that depict a biomarker expression;
extracting at least one image feature characterizing the image object in the stained tissue image;
classifying, based on the extracted at least one image feature, the image object as cells according to at least one predefined membrane staining pattern; and
outputting, for each classified cell, a class label identifying a class to which the classified cell belongs.

7. The method of claim 6, wherein the at least two separate images include a membrane-stained tissue image and a counter-stained image, and the stained tissue image is the membrane-stained tissue image.

8. The method of claim 7, wherein extracting the extracted at least one image feature includes applying a difference of Gaussian filter to the membrane-stained tissue image to generate a filtered image.

9. The method of claim 8, wherein extracting the extracted image feature further includes applying an Otsu thresholding module to the filtered image for generating a membrane mask image.

10. The method of claim 9, wherein extracting the extracted image feature further includes extracting blob objects from membrane mask image within a sub-region of interest by connecting features within the sub-region of interest.

11. The method of claim 10, wherein classifying the cells includes computing statistical values related to the blob objects for every detected cell.

12. The method of claim 10, wherein classifying the cells further includes discriminating between an elliptical membrane staining pattern and a punctate membrane staining pattern.

13. An image analysis system for classifying cells in a tissue image, the system comprising:

a processor;
a memory storing computer-readable instructions, which when executed by the processor, cause the processor to:
access a tissue image, wherein the cells in the tissue image comprise membranes;
threshold the tissue image to generate a membrane mask image, the membrane mask image depicting membrane features corresponding to the membranes of the cells;
extract blob objects from the membrane mask image within a sub-region of interest by connecting the membrane features within the sub-region of interest;
classify, based on the blob objects, one or more of the cells within the sub-region of interest according to at least one membrane staining pattern; and
output, for each of the one or more classified cells, a class label identifying a class to which a respective classified cell belongs.

14. The image analysis system of claim 13, wherein the at least one membrane staining pattern comprises at least one of an elliptical staining pattern and punctate staining pattern.

15. The image analysis system of claim 13, further comprising extracting at least one feature from the tissue image.

16. The image analysis system of claim 13, further comprising storing outputted class labels.

17. The image analysis system of claim 13, wherein the class labels include statistical values corresponding to respective image objects of a set of image objects in the tissue image.

18. A non-transitory computer-readable medium including instructions which, when executed by one or more processors, cause the one or more processors to perform one or more operations comprising:
access a tissue image, wherein cells in the tissue image comprise membranes;
threshold the tissue image to generate a membrane mask image, the membrane mask image depicting membrane features corresponding to the membranes of the cells;
extract blob objects from the membrane mask image within a sub-region of interest by connecting the membrane features within the sub-region of interest;
classify, based on the blob objects, one or more of the cells within the sub-region of interest according to at least one membrane staining pattern; and
output, for each of the one or more classified cells, a class label identifying a class to which a respective classified cell belongs.

19. The non-transitory computer-readable medium of claim 18, further comprising performing a color deconvolution on the tissue image to identify distinct color channels in the tissue image and generate at least two separate images from the tissue image.

20. The non-transitory computer-readable medium of claim 19, wherein said at least two separate images include a membrane-stained tissue image and a counter-stained image.

* * * * *